United States Patent
Li et al.

(10) Patent No.: US 10,172,093 B2
(45) Date of Patent: Jan. 1, 2019

(54) CLOSED-LOOP CLOCK CALIBRATION METHOD, TERMINAL AND COMPUTER STORAGE MEDIUM

(71) Applicant: Sanechips Technology Co., Ltd., Shenzhen, Guangdong (CN)

(72) Inventors: Yan Li, Shenzhen (CN); Junling Zhang, Shenzhen (CN)

(73) Assignee: Sanechips Technology Co. Ltd., Shenzhen, Guangdong (CN)

( * ) Notice: Subject to any disclaimer, the term of this patent is extended or adjusted under 35 U.S.C. 154(b) by 0 days.

(21) Appl. No.: 15/545,035

(22) PCT Filed: Jul. 22, 2015

(86) PCT No.: PCT/CN2015/084794
§ 371 (c)(1),
(2) Date: Jul. 20, 2017

(87) PCT Pub. No.: WO2016/115855
PCT Pub. Date: Jul. 28, 2016

(65) Prior Publication Data
US 2018/0007635 A1    Jan. 4, 2018

(30) Foreign Application Priority Data
Jan. 20, 2015    (CN) .......................... 2015 1 0027790

(51) Int. Cl.
*H04W 52/02*    (2009.01)
(52) U.S. Cl.
CPC ..... *H04W 52/0287* (2013.01); *H04W 52/029* (2013.01); *Y02D 70/24* (2018.01)

(58) Field of Classification Search
CPC .................................. H04W 52/0287–52/0293
See application file for complete search history.

(56) References Cited

U.S. PATENT DOCUMENTS

| | | |
|---|---|---|
| 8,135,553 B2 | 3/2012 | Yang |
| 2007/0135081 A1 | 6/2007 | Bultan |

(Continued)

FOREIGN PATENT DOCUMENTS

| | | |
|---|---|---|
| CN | 1874566 A | 12/2006 |
| CN | 101064898 A | 10/2007 |

(Continued)

OTHER PUBLICATIONS

International Search Report in international application No. PCT/CN2015/084794, dated Sep. 18, 2015, 2 pgs.

(Continued)

*Primary Examiner* — Raymond Dean
(74) *Attorney, Agent, or Firm* — Cooper Legal Group, LLC

(57) ABSTRACT

Disclosed is a closed-loop clock calibration method, comprising: performing clock calibration according to a calibration factor of an $n^{th}$ calibration period within the $n^{th}$ calibration period, and obtaining a calibration error of the $n^{th}$ calibration period; and according to the calibration error and calibration factor of the $n^{th}$ calibration period, obtaining a calibration factor of an $(n+1)^{th}$ calibration period, n being a positive integer. Also disclosed are a terminal and a computer storage medium.

19 Claims, 3 Drawing Sheets

(56) References Cited

U.S. PATENT DOCUMENTS

2010/0029267 A1    2/2010  Yang
2011/0066874 A1    3/2011  Shen
2014/0021997 A1*   1/2014  Liu .................... H04W 52/029
                                                        327/292

FOREIGN PATENT DOCUMENTS

| CN | 101090547 A | 12/2007 |
| --- | --- | --- |
| CN | 101541073 A | 9/2009 |
| CN | 101959298 A | 1/2011 |
| CN | 102540868 A | 7/2012 |
| CN | 102405678 B | 1/2014 |
| WO | 2011113377 A2 | 9/2011 |

OTHER PUBLICATIONS

English Translation of the Written Opinion of the International Search Authority in international application No. PCT/CN2015/084794, dated Sep. 18, 2015, 5 pgs.

Supplementary European Search Report in European application No. 15878526.1, dated Dec. 21, 2017, 9 pgs.

\* cited by examiner

CLOSED-LOOP CLOCK CALIBRATION METHOD, TERMINAL AND COMPUTER STORAGE MEDIUM

TECHNICAL FIELD

The disclosure relates to a clock calibration technology in the field of wireless communication, and particularly to a closed-loop clock calibration method, a terminal and a computer storage medium.

BACKGROUND

In a wireless cellular communication system, when a terminal in the system executes no service or fewer services, the terminal may usually enter a Discontinuous Reception (DRX) time period. Usually, the DRX time period is divided into two time periods: an active time period and a sleep time period, as shown in FIG. 1. The terminal may turn off most of internal operation units when entering the sleep time period. The operation unit includes a system clock which may also be called as a high-frequency clock. At this point, the terminal turns off the high-frequency clock and adopts a low-frequency clock with a lower frequency and lower power consumption to maintain system timing. For example, most of terminals in the wireless cellular communication system usually maintain system timing by adopting low-frequency clocks with a frequency of 32.768 kHz. When entering the active time period, the terminal recovers the system timing through the low-frequency clock in the sleep time period at first, and converts the low-frequency clock into a high-frequency clock through multiplying the low-frequency clock by a calibration factor, so as to recover the system timing. Since the low-frequency clock has relatively lower accuracy and stability and cannot perform temperature compensation, the low-frequency clock may be influenced by a factor such as an environment and a temperature. After the terminal recovers the system timing, the system timing may have a calibration deviation, and the terminal further performs frequency and time synchronization, and then may initiate or receive paging. It can be seen that the terminal should regulate the calibration factor to make the recovered system timing more accurate, thereby improving execution efficiency of a subsequent synchronization operation.

In an existing calibration factor regulation manner, a system clock (high-frequency clock) is usually adopted as a calibration clock, to calibrate a low-frequency clock. That is, the high-frequency clock and the low-frequency clock operate simultaneously and count respectively, and after a time period, a ratio of the high-frequency clock to the low-frequency clock is calculated to obtain a calibration factor. However, the high-frequency clock may be influenced by clock jitter. Therefore, the existing calibration factor regulation manner should increase a calibration time to ensure calibration accuracy. The higher the calibration accuracy is, the longer the calibration time is. Usually, the calibration time should be more than 100 ms. However, an excessively long calibration time may reduce a sleep time of a terminal in the sleep time period, which may increase standby power consumption of the terminal.

SUMMARY

In view of this, it is desired to provide a closed-loop clock calibration method, a terminal and a computer storage medium, according to embodiments of the disclosure.

For this purpose, the technical solutions of the disclosure are implemented as follows.

An embodiment of the disclosure provides a closed-loop clock calibration method. The method includes the following steps.

In an $n^{th}$ calibration period, clock calibration is performed according to a calibration factor of an $n^{th}$ calibration period, and a calibration error of the $n^{th}$ calibration period is obtained.

A calibration factor of an $(n+1)^{th}$ calibration period is obtained according to the calibration error and calibration factor of the $n^{th}$ calibration period, where n is a positive integer.

According to an embodiment, the method may further include a step in which a calibration factor of a first calibration period is preset.

According to an embodiment, the step of presetting the calibration factor of the first calibration period may include the following steps.

A calibration factor is obtained according to a theoretical frequency value of a system clock and a theoretical frequency value of a low-frequency clock.

The obtained calibration factor is preset as the calibration factor of the first calibration period.

According to an embodiment, the step of presetting the calibration factor of the first calibration period may include the following steps.

In a preset time period, the system clock and the low-frequency clock are caused to operate simultaneously and count respectively.

After the preset time period, a ratio of a count value of a system clock period to a count value of a low-frequency clock period is calculated to obtain a calibration factor. The obtained calibration factor is preset as the calibration factor of the first calibration period.

Specially, the step of, in the $n^{th}$ calibration period, performing clock calibration according to the calibration factor of the $n^{th}$ calibration period and obtaining the calibration error of the $n^{th}$ calibration period may include the following steps.

In the $n^{th}$ calibration period, the low-frequency clock is converted into converted into the system clock to recover system timing through multiplying low-frequency clock by the calibration factor of the $n^{th}$ calibration period. The calibration error Δt of the $n^{th}$ calibration period is obtained according to the following formula:

$$\Delta t = T_S - T_C$$

where $T_S$ is an actual system timing, and $T_C$ may be the system timing recovered through the calibration factor of the $n^{th}$ calibration period.

According to an embodiment, the step of obtaining the calibration factor of the $(n+1)^{th}$ calibration period according to the calibration error and calibration factor of the $n^{th}$ calibration period may include the following steps.

The calibration factor f(n+1) of the $(n+1)^{th}$ calibration period is derived from the calibration error and calibration factor of the $n^{th}$ calibration period and according to the following formula:

$$f(n+1) = f(n) + \frac{\Delta t}{T_{Sleep}} f(n),$$

where f(n) is the calibration factor of the $n^{th}$ calibration period, $\Delta t$ is the calibration error of the $n^{th}$ calibration period, and $T_{Sleep}$ is a sleep time period in a DRX time period.

According to an embodiment, the calibration period may be preset to be at least one DRX time period.

Based on the method, an embodiment of the disclosure further provides a terminal. The terminal includes: a calibration error extraction unit and a calibration factor regulation unit.

The calibration error extraction unit is arranged to: in an $n^{th}$ calibration period, perform clock calibration according to a calibration factor of the $n^{th}$ calibration period, and obtain a calibration error of the $n^{th}$ calibration period.

The calibration factor regulation unit is arranged to obtain a calibration factor of an $(n+1)^{th}$ calibration period according to the calibration error and calibration factor of the $n^{th}$ calibration period, where n is a positive integer.

According to an embodiment, the terminal may further include an initial value presetting unit.

The initial value presetting unit is arranged to preset a calibration factor of a first calibration period.

According to an embodiment, the initial value presetting unit may be further arranged to obtain a calibration factor according to a theoretical frequency value of a system clock and a theoretical frequency value of a low-frequency clock, and preset the obtained calibration factor as the calibration factor of the first calibration period.

According to an embodiment, the initial value presetting unit may be further arranged to: in a preset time period, cause the system clock and the low-frequency clock to operate simultaneously and count respectively; after the preset time period, calculate a ratio of a count value of a system clock period to a count value of a low-frequency clock period to obtain a calibration factor; and preset the obtained calibration factor as the calibration factor of the first calibration period.

According to an embodiment, the calibration period may be preset to be at least one DRX time period.

An embodiment of the disclosure further provides a computer storage medium including a set of instructions. The instructions, when being executed, causes at least one processor to execute the abovementioned closed-loop clock calibration method.

According to the closed-loop clock calibration method, terminal and computer storage medium provided by the embodiments of the disclosure, in the $n^{th}$ calibration period, the clock calibration is performed according to the calibration factor of the $n^{th}$ calibration period, and the calibration error of the $n^{th}$ calibration period is obtained. The calibration factor of the $(n+1)^{th}$ calibration period is obtained according to the calibration error and calibration factor of the $n^{th}$ calibration period, where n is a positive integer. In this manner, closed-loop clock calibration is performed according to the calibration error, which may not only improve clock calibration accuracy but also reduce standby power consumption of the terminal.

DETAILED DESCRIPTION

According to embodiments of the disclosure, in the $n^{th}$ calibration period, clock calibration is performed according to a calibration factor of an $n^{th}$ calibration period, and a calibration error of the $n^{th}$ calibration period is obtained; and a calibration factor of an $(n+1)^{th}$ calibration period is obtained according to the calibration error and calibration factor of the $n^{th}$ calibration period, where n is a positive integer.

A specific implementations of the disclosure will be described below with reference to the drawings.

Figure 1:
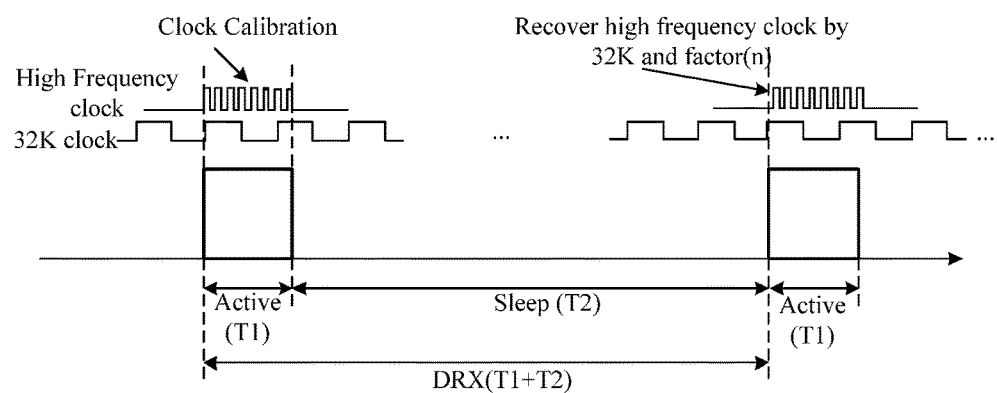
FIG. 1 is a schematic structure diagram of a DRX time period according to a related technology.
Figure 2:
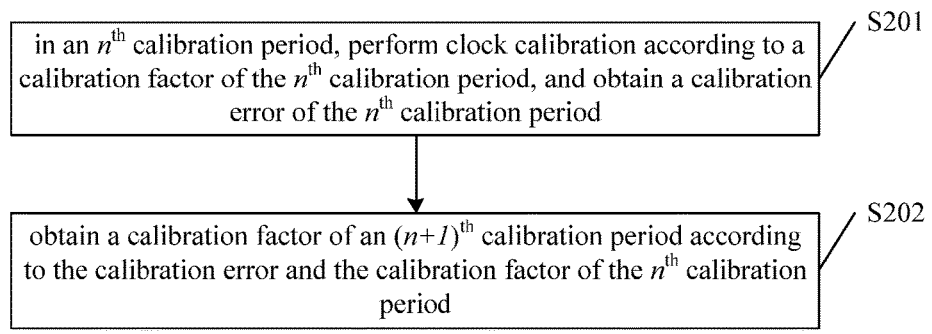
FIG. 2 is a schematic implementation flowchart of a closed-loop clock calibration method according to an embodiment of the disclosure.

As shown in FIG. 2, a closed-loop clock calibration flow provided by an embodiment of the disclosure includes the following steps.

Step S201: in an $n^{th}$ calibration period, clock calibration is performed according to a calibration factor of the $n^{th}$ calibration period, and a calibration error of the $n^{th}$ calibration period is obtained, where n is a positive integer.

Here, the calibration period T is usually at least one a Discontinuous Reception (DRX) time period $T_{DRX}$, $T_{DRX}=T_{Active}+T_{Sleep}$, where $T_{Active}$ is an active time period in the DRX time period $T_{DRX}$, and $T_{Sleep}$ is a sleep time period in the DRX time period $T_{DRX}$.

Here, a calibration factor used in a first calibration period is an initial calibration factor, and the initial calibration factor may be preset in the following two manners.

A first manner a calibration factor f(1) is derived from a theoretical frequency value of a system clock and a theoretical frequency value of a low-frequency clock according to the following formula:

$$f(1) = \frac{F_d}{F_g}$$

where $F_d$ is the theoretical frequency value of the low-frequency clock, and $F_g$ is the theoretical frequency value of the system clock (high-frequency clock).

The obtained calibration factor f(1) is preset as the calibration factor of the first calibration period.

A second manner clock calibration of a preset time period is performed to obtain a calibration factor by virtue of the system clock. A specific implementation process includes the following steps.

The system clock and the low-frequency clock are caused to operate simultaneously and count respectively in the preset time period.

A ratio of a count value of a system clock period to a count value of a low-frequency clock period is calculated to obtain a calibration factor after the preset time period.

The obtained calibration factor is preset as the calibration factor of the first calibration period.

The step of within the $n^{th}$ calibration period performing clock calibration according to the calibration factor of the $n^{th}$ calibration period and obtaining the calibration error of the $n^{th}$ calibration period will be described below in detail.

In the $n^{th}$ calibration period, when an active stage is entered, the low-frequency clock of a sleep stage is converted into the system clock through multiplying the low-frequency clock of the sleep stage by the calibration factor of the $n^{th}$ calibration period, thereby recovering system timing in the $n^{th}$ calibration period. The calibration error $\Delta t$ of the $n^{th}$ calibration period is derived according to the following formula:

$$\Delta t = T_S - T_C,$$

where $T_S$ is actual system timing, and $T_C$ is the system timing recovered through the calibration factor of the $n^{th}$ calibration period.

Here, the actual system timing $T_S$ may be obtained by a frequency and time synchronization process after the system timing is recovered. There is a conventional means to obtain the actual system timing $T_S$, and the details thereof will not be elaborated.

It is should be noted that, when $\Delta t > 0$, i.e., when the timing recovered through the calibration factor of the $n^{th}$ calibration period is earlier than the actual timing, the calibration factor of the $n^{th}$ calibration period should be decreased and the regulated calibration factor is adopted for clock calibration in a next calibration period. When $\Delta t < 0$, i.e., when the timing recovered through the calibration factor of the $n^{th}$ calibration period is later than the actual timing, the calibration factor of the $n^{th}$ calibration period should be increased and the regulated calibration factor for clock calibration in the next calibration period.

Step S202: a calibration factor of an $(n+1)^{th}$ calibration period is obtained according to the calibration error and calibration factor of the $n^{th}$ calibration period.

Specifically, before the $(n+1)^{th}$ calibration period, the calibration factor $f(n+1)$ of the $(n+1)^{th}$ calibration period is derived from the calibration error and calibration factor of the $n^{th}$ calibration period according to the following formula:

$$f(n+1) = f(n) + \frac{\Delta t}{T_{Sleep}} f(n),$$

where $f(n)$ is the calibration factor of the $n^{th}$ calibration period, $\Delta t$ is the calibration error of the $n^{th}$ calibration period, and $T_{Sleep}$ is the sleep time period in the DRX time period.

According to the embodiment of the disclosure, before the $(n+1)^{th}$ calibration period, the calibration factor of the $n^{th}$ calibration period is regulated according to the calibration error of the $n^{th}$ calibration period, so as to obtain the calibration factor of the $(n+1)^{th}$ calibration period. The calibration factor of the $(n+1)^{th}$ calibration period is adopted for clock calibration in the $(n+1)^{th}$ calibration period, and so on, to implement closed-loop clock calibration. In this manner, closed-loop clock calibration is performed according to the calibration error, and thus clock calibration accuracy can be improved. Moreover, since the calibration method according to the embodiment of the disclose is independent of the system clock, the problem of excessively long calibration time in the conventional art is solved, and thus standby power consumption of a terminal is reduced.

In order to make the embodiment of the disclosure to be clearer, a data exchange flow in the embodiment of the disclosure will be described below in detail with a specific embodiment.

First Embodiment

A terminal presets a calibration period T to be a DRX time period $T_{DRX}$, and presets a calibration factor of a first calibration period to be $f(1)$.

In the first calibration period, when an active stage is entered, a low-frequency clock of a sleep stage is converted into a system clock through multiplying the low-frequency clock of the sleep stage by $f(1)$, so as to recover system timing. Then, a calibration error $\Delta t_1$ caused by clock calibration with $f(1)$ is calculated from actual system timing $T_{S1}$ and the system timing $T_{C1}$ recovered through $f(1)$, according to $\Delta t_1 = T_{S1} - T_{C1}$.

Then, before a second calibration period, $f(1)$ is corrected to obtain $f(2)$ according to the calibration error $\Delta t_1$. The $f(2)$ is adopted for clock calibration in the second calibration period.

In the second calibration period, when an active stage is entered, a low-frequency clock of a sleep stage is converted into a system clock through multiplying the low frequency clock of the sleep stage by $f(2)$, so as to recover system timing. Then, a calibration error $\Delta t_2$ caused by clock calibration with $f(2)$ is calculated from actual system timing $T_{S2}$ and the system timing $T_{C2}$ recovered through $f(2)$, according to $\Delta t_2 = T_{S2} - T_{C2}$.

Then, before a third calibration period, $f(2)$ is corrected to obtain $f(3)$ according to the calibration error $\Delta t_2$. The $f(3)$ is adopted for clock calibration in the third calibration period.

In this manner, clock calibration is performed according to a corrected calibration factor of a previous calibration period in an $n^{th}$ calibration period, and a calibration error of the $n^{th}$ calibration period is obtained. A calibration factor of the $n^{th}$ calibration period is corrected according to the calibration error of the $n^{th}$ calibration period, so as to obtain a corrected calibration factor. The corrected calibration factor is adopted for clock calibration in a next calibration period. In this way, the closed-loop clock calibration can be implemented.

In order to implement the abovementioned method, an embodiment of the disclosure provides a terminal. A principle of the terminal for solving the problem is similar to the method, so that an implementation process and implementation principle of the terminal may refer to descriptions about an implementation process and implementation principle of the method, and repeated parts will not be elaborated.

Figure 3:
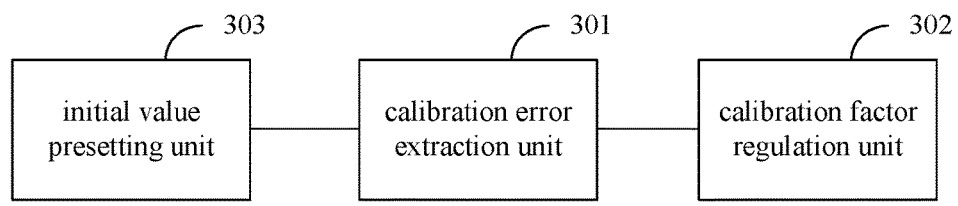
FIG. 3 is a schematic structure diagram of a terminal according to an embodiment of the disclosure.

As shown in FIG. 3, the terminal provided by the embodiment of the disclosure includes: a calibration error extraction unit 301 and a calibration factor regulation unit 302.

The calibration error extraction unit 301 is arranged to perform clock calibration according to a calibration factor of an $n^{th}$ calibration period in the nth calibration period, and obtain a calibration error of the $n^{th}$ calibration period.

The calibration factor regulation unit 302 is arranged to obtain a calibration factor of an $(n+1)^{th}$ calibration period according to the calibration error and calibration factor of the $n^{th}$ calibration period, where n is a positive integer.

The calibration period is preset to be at least one DRX time period.

The division of the above function units or modules is merely a preferred implementation provided by the embodiment of the disclosure, and is not intended to limit the disclosure.

Furthermore, the terminal may further include an initial value presetting unit 303.

The initial value presetting unit 303 is arranged to preset a calibration factor of a first calibration period.

Specially, the initial value presetting unit 303 is arranged to obtain a calibration factor according to a theoretical frequency value of a system clock and a theoretical frequency value of a low-frequency clock, and preset the obtained calibration factor as the calibration factor of the first calibration period.

Specially, the initial value presetting unit 303 is arranged to cause the system clock and the low-frequency clock to operate simultaneously and count respectively in a preset time period, calculate a ratio of a count value of a system clock period to a count value of a low-frequency clock period to obtain a calibration factor after the preset time period, and preset the obtained calibration factor as the calibration factor of the first calibration period.

In practice, the calibration error extraction unit 301, the calibration factor regulation unit 302 and the initial value presetting unit 303 may be implemented by a Central Processing Unit (CPU), Micro Processing Unit (MPU), Digital Signal Processor (DSP) or Field-Programmable Gate Array (FPGA) located in the terminal.

Those skilled in the art should know that the embodiment of the disclosure may be provided as a method, a system or a computer program product. Therefore, the disclosure may adopt a form of hardware embodiment, software embodiment or combined software and hardware embodiment. Moreover, the disclosure may adopt a form of computer program product implemented on one or more computer-available storage media (including, but not limited to, a disk memory, an optical memory and the like) including computer-available program codes.

The disclosure is described with reference to flowcharts and/or block diagrams of the method, equipment (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams. These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

On such a basis, an embodiment of the disclosure further provides a computer storage medium, which includes a set of instructions, the instructions being executed to cause at least one processor to execute the abovementioned closed-loop clock calibration method.

The method of the disclosure is not limited to the embodiments in the detailed description, and other implementation modes obtained by those skilled in the art according to the technical solutions of the disclosure shall also fall within the scope of technical innovation of the disclosure.

Obviously, those skilled in the art may make various modifications and transformations to the disclosure without departing from the spirit and scope of the disclosure. Therefore, if these modifications and transformations of the disclosure fall within the scope of the claims of the disclosure and an equivalent technology thereof, the disclosure is also intended to include these modifications and transformations.

The invention claimed is:

1. A closed-loop clock calibration method, comprising:
   in an $n^{th}$ calibration period, performing clock calibration according to a calibration factor of the $n^{th}$ calibration period, and obtaining a calibration error of the $n^{th}$ calibration period; and
   obtaining a calibration factor of an $(n+1)^{th}$ calibration period according to the calibration error and calibration factor of the $n^{th}$ calibration period, wherein n is a positive integer,
   wherein obtaining the calibration factor of the $(n+1)^{th}$ calibration period according to the calibration error and calibration factor of the $n^{th}$ calibration period comprises:
      deriving the calibration factor f(n+1) of the $(n+1)^{th}$ calibration period from the calibration error and calibration factor of the $n^{th}$ calibration period according to the following formula:

$$f(n+1) = f(n) + \frac{\Delta t}{T_{Sleep}} f(n)$$

wherein f(n) is the calibration factor of the $n^{th}$ calibration period, $\Delta t$ is the calibration error of the $n^{th}$ calibration period, and $T_{Sleep}$ is a sleep time period in a Discontinuous Reception (DRX) time period.

2. The method according to claim 1, further comprising: presetting a calibration factor of a first calibration period.

3. The method according to claim 2, wherein presetting the calibration factor of the first calibration period comprises:
   obtaining a calibration factor according to a theoretical frequency value of a system clock and a theoretical frequency value of a low-frequency clock; and
   presetting the obtained calibration factor as the calibration factor of the first calibration period.

4. The method according to claim 2, wherein presetting the calibration factor of the first calibration period comprises:
   in a preset time period, causing a system clock and a low-frequency clock to operate simultaneously and count respectively;
   after the preset time period, calculating a ratio of a count value of a system clock period to a count value of a low-frequency clock period to obtain a calibration factor; and
   presetting the obtained calibration factor as the calibration factor of the first calibration period.

5. The method according to claim 1, wherein, in the $n^{th}$ calibration period, performing clock calibration according to the calibration factor of the $n^{th}$ calibration period and obtaining the calibration error of the $n^{th}$ calibration period comprises:
   in the $n^{th}$ calibration period, converting a low-frequency clock into a system clock through multiplying the low-frequency clock by the calibration factor of the $n^{th}$ calibration period, so as to recover system timing; and obtaining the calibration error Δt of the n$^{th}$ calibration period according to the following formula:

$$\Delta t = T_S - T_C$$

wherein $T_S$ is actual system timing, and $T_C$ is the system timing recovered through the calibration factor of the n$^{th}$ calibration period.

6. The method according to claim 1, wherein a calibration period is preset to be at least one DRX time period.

7. A terminal, comprising:
a memory storing processor-executable instructions; and
a processor arranged to execute the stored processor-executable instructions to perform steps of:
in an n$^{th}$ calibration period, performing clock calibration according to a calibration factor of the n$^{th}$ calibration period, and obtaining a calibration error of the n$^{th}$ calibration period; and
obtaining a calibration factor of an (n+1)$^{th}$ calibration period according to the calibration error and calibration factor of the n$^{th}$ calibration period, wherein n is a positive integer,
wherein obtaining the calibration factor of the (n+1)$^{th}$ calibration period according to the calibration error and calibration factor of the n$^{th}$ calibration period comprises:
deriving the calibration factor f(n+1) of the (n+1)$^{th}$ calibration period from the calibration error and calibration factor of the n$^{th}$ calibration period according to the following formula:

$$f(n+1) = f(n) + \frac{\Delta t}{T_{Sleep}} f(n)$$

wherein f(n) is the calibration factor of the n$^{th}$ calibration period, Δt is the calibration error of the n$^{th}$ calibration period, and $T_{Sleep}$ is a sleep time period in a Discontinuous Reception (DRX) time period.

8. The terminal according to claim 7, wherein the processor is arranged to execute the stored processor-executable instructions to further perform a step of:
presetting a calibration factor of a first calibration period.

9. The terminal according to claim 8, wherein the processor is arranged to execute the stored processor-executable instructions to further perform-a steps of:
obtaining a calibration factor according to a theoretical frequency value of a system clock and a theoretical frequency value of a low-frequency clock; and
presetting the obtained calibration factor as the calibration factor of the first calibration period.

10. The terminal according to claim 8, wherein the processor is arranged to execute the stored processor-executable instructions to further perform-a steps of:
in a preset time period, causing a system clock and a low-frequency clock to operate simultaneously and count respectively;
after the preset time period, calculating a ratio of a count value of a system clock period to a count value of a low-frequency clock period to obtain a calibration factor; and
presetting the obtained calibration factor as the calibration factor of the first calibration period.

11. The terminal according to claim 7, wherein a calibration period is preset to be at least one DRX time period.

12. A non-transitory computer storage medium comprising a set of instructions, wherein the set of instructions, when being executed, cause at least one processor to execute a closed-loop clock calibration method, the method comprising:
in an n$^{th}$ calibration period, performing clock calibration according to a calibration factor of the n$^{th}$ calibration period, and obtaining a calibration error of the n$^{th}$ calibration period; and
obtaining a calibration factor of an (n+1)$^{th}$ calibration period according to the calibration error and calibration factor of the n$^{th}$ calibration period, wherein n is a positive integer,
wherein obtaining the calibration factor of the (n+1)$^{th}$ calibration period according to the calibration error and calibration factor of the n$^{th}$ calibration period comprises:
deriving the calibration factor f(n+1) of the (n+1)$^{th}$ calibration period from the calibration error and calibration factor of the n$^{th}$ calibration period according to the following formula:

$$f(n+1) = f(n) + \frac{\Delta t}{T_{Sleep}} f(n)$$

wherein f(n) is the calibration factor of the n$^{th}$ calibration period, Δt is the calibration error of the n$^{th}$ calibration period, and $T_{Sleep}$ is a sleep time period in a Discontinuous Reception (DRX) time period.

13. The method according to claim 2, wherein a calibration period is preset to be at least one DRX time period.

14. The method according to claim 3, wherein a calibration period is preset to be at least one DRX time period.

15. The method according to claim 4, wherein a calibration period is preset to be at least one DRX time period.

16. The method according to claim 5, wherein a calibration period is preset to be at least one DRX time period.

17. The terminal according to claim 10, wherein a calibration period is preset to be at least one DRX time period.

18. The terminal according to claim 8, wherein a calibration period is preset to be at least one DRX time period.

19. The terminal according to claim 9, wherein a calibration period is preset to be at least one DRX time period.

* * * * *